United States Patent
Griffin, Jr. et al.

(10) Patent No.: US 8,306,476 B2
(45) Date of Patent: Nov. 6, 2012

(54) DIGITAL CONTROLLER AND TRANSMITTER FOR PORTABLE ELECTRONIC DEVICE

(75) Inventors: Paul P. Griffin, Jr., Nasville, TN (US); David A. Gilbert, Nashville, TN (US)

(73) Assignee: Griffin Technology, Inc., Nashville, TN (US)

( * ) Notice: Subject to any disclaimer, the term of this patent is extended or adjusted under 35 U.S.C. 154(b) by 754 days.

(21) Appl. No.: 11/779,862

(22) Filed: Jul. 18, 2007

(65) Prior Publication Data

US 2009/0023483 A1     Jan. 22, 2009

(51) Int. Cl.
*H04B 1/00* (2006.01)
(52) U.S. Cl. ............................ 455/42; 455/39; 455/575.1
(58) Field of Classification Search ................ 455/39, 455/42, 575.1
See application file for complete search history.

(56) References Cited

U.S. PATENT DOCUMENTS

| | | | | |
|---|---|---|---|---|
| 5,517,678 A | * | 5/1996 | Klank et al. | 455/182.2 |
| 5,588,022 A | * | 12/1996 | Dapper et al. | 375/216 |
| 5,779,496 A | * | 7/1998 | Bolinger et al. | 439/377 |
| 7,412,294 B1 | * | 8/2008 | Woolfork | 700/94 |

* cited by examiner

*Primary Examiner* — Lana N Le
*Assistant Examiner* — Hsin-Chun Liao
(74) *Attorney, Agent, or Firm* — Hornkohl Intellectual Property Law, PLLC; Jason L. Hornkohl

(57) ABSTRACT

A transmitting accessory couples with a portable electronic device such that audio signals or data from the device can be digitally transmitted to a remote receiver. The accessory includes an input port for receiving audio data from the portable electronic device. A digital transmitter transmits digital data corresponding to the audio signals or data from the portable electronic device to the remote digital receiver. If the audio signal is an analog signal, the accessory uses encoding circuitry to digitally encode the analog audio signal for transmission. The audio signal may be encoded into an HD radio format for reception by an HD radio receiver. The user inputs of the portable electronic device can preferably be used to control functions of the accessory and the device's display to display the selected transmission frequency or channel.

7 Claims, 4 Drawing Sheets

DIGITAL CONTROLLER AND TRANSMITTER FOR PORTABLE ELECTRONIC DEVICE

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

Analog transmitters for digital music players which allow a user to transmit audio from the device to a remote receiver are known in the prior art. While these devices are widely used and popular devices, they suffer from a number of drawbacks. First, the audio is transmitted from the transmitter to the receiver in analog form. Thus, the signal may become distorted by the transmission process. In addition, any ambient interference present in the received analog signal is very difficult to remove or counter and will further distort the original signal. A further drawback is that these analog devices cannot transmit data concerning the music such as title and artist from the music player to the remote receiver. Current analog transmitters are also not capable of communicating control signals between the device and the remote receiver. Therefore, what is needed is an improved transmitter for a portable electronic device that can transmit substantially interference free audio signals and control data to a remote receiver.

BRIEF SUMMARY OF THE INVENTION

An embodiment of the present invention is directed toward an accessory for coupling with a portable electronic device. The housing of the accessory is designed to be physically coupled to a housing of the portable electronic device such that the portable electronic device and the accessory can be carried as a single unit. The accessory includes an input port for receiving audio data from the portable electronic device. If the audio data is an analog signal, the accessory uses encoding circuitry to digitally encode the analog audio signal into digital data. The digital data is then encoded by an HDC codec into a digital broadcast radio format. A digital transmitter in the accessory transmits the digital data corresponding to the audio data from the portable electronic device to a remote digital broadcast radio receiver. The accessory preferably configures the remote receiver to receive the data on a particular transmission channel or frequency. The user inputs of the portable electronic device can be used to select the transmission frequency or channel of the accessory and control the accessory's functions. The selected channel or frequency is then displayed on the screen of the portable electronic device. The accessory can be configured as either a parasitic device that obtains power from the portable electronic device or to receive power from an external power supply connection that it uses to charge the device.

Another embodiment of the present invention is directed toward an accessory for use with a portable electronic device. The accessory includes an audio input for receiving an analog audio signal from a portable electronic device and a digital encoder that produces digital data corresponding to the analog audio signal in a satellite radio format. A digital transmitter in the accessory transmits the digital data corresponding to the audio data to a remote satellite radio receiver. The housing of the accessory is preferably configured to physically couple to the housing of the digital music player and the user inputs of the portable electronic device can be used to control functions of the accessory.

Yet another embodiment of the present invention is directed toward a method of transmitting an analog audio signal from a portable electronic device to a digital remote receiver. In accordance with the method, the analog audio signal from the device is received with the accessory. The audio signal is then converted into digital data formatted for reception by the remote receiver. A transmission channel of the accessory is selected with a user input of the portable electronic device and displayed on a display of the accessory of portable electronic device. The digital data from the accessory is transmitted to the remote receiver. A digital message transmitted from the device may be displayed on a display screen of the remote receiver.

DETAILED DESCRIPTION OF THE INVENTION

Figure 1:
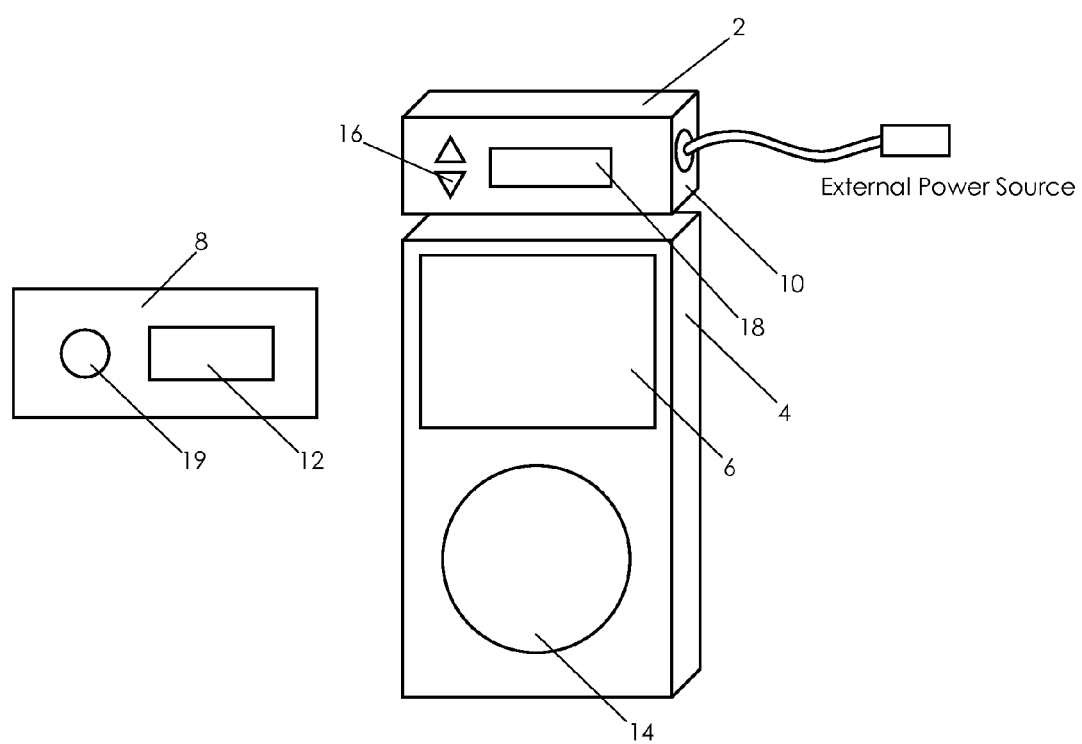
FIG. 1 is an illustration of an accessory constructed in accordance with an embodiment of the present invention coupled to a portable electronic device.

The present invention is directed toward an accessory for a portable electronic device that transmits digital information between the portable electronic device and a remote digital receiver. Referring now to FIG. 1, an illustration of an accessory 2 constructed in accordance with an embodiment of the present invention coupled to a portable electronic device 4 is shown. The accessory 2 has a digital data transmitter that is designed to couple with the portable electronic device 4 such that digital or analog data received by the accessory 2 from the portable electronic device 4 can be broadcast to an external digital receiver 8 such as a digital radio or satellite equipped car or home radio. The accessory 2 has an input/output connector such as a USB, 30 pin, etc. that is used to electrically and physically couple the accessory 2 to a corresponding input/output connector on the device 4. The particular type of input/output connector selected for the accessory 2 depends upon the type of input/output connector on the device 4 for which the accessory 2 is designed. The accessory 2 also preferably has a housing 10 that is designed to be coupled with the portable electronic device 4 such that the accessory 2 and the portable electronic device 4 function, and can be carried, as a single unit.

In the embodiment of FIG. 1, user inputs 16 such as scan, up/down, etc. and a display 18 are provided on the accessory 2 housing itself. The user inputs 16 on the accessory 2 allow a user to select a frequency or channel on which to broadcast the data received from the device 4. An unused channel or frequency is preferably selected by the user for transmission of digital data between the accessory 2 and the remoter receiver 8 to minimize interference. The accessory 2 can also be configured to instruct the receiver 8 to search for a clear channel for the transmission if the receiver is so equipped or provided with a receiver and search routine so that the accessory 2 locates the clearest channel for the transmission. The user inputs 16 are preferably a small number of soft buttons that can be reconfigured to control the various functions of the accessory 2 such that the number of user inputs required by the accessory, and their associated costs, are minimized.

The accessory 2 can preferably write text to the portable electronic device's 6 and the remote receiver's display 12 and repurpose the controls 14 of the portable electronic device 4 to control functions of the accessory 2, device 4 and receiver 8. In such an embodiment, the accessory 2 can digitally instruct the receiver 8 to tune to the frequency or channel selected with the controls 14 of the device 4. The accessory controls 16 or device controls 14 can also be used to manipulate accessory generated menus displayed on a display screen 8 of the portable device 4 or receiver 8. By selecting the proper menus, device 4 and receiver 8 functions, such as the volume, operating mode, display, etc., can be controlled through manipulation of the controls 14. Which particular controls to use to control which particular functions will be determined based upon the particular type of portable electronic device and remote receiver for which the accessory is designed or configured.

The accessory 2 user inputs 16 may include a voice activation system that allows a user to control the accessory or device through voice commands. In such an embodiment, the user inputs 16 include a microphone that detects the voice commands. Voice recognition software then interprets the output of the microphone into accessory commands. The software can also be used to process the microphone output to prevent the audio output from being interpreted as a voice command.

Figure 2:
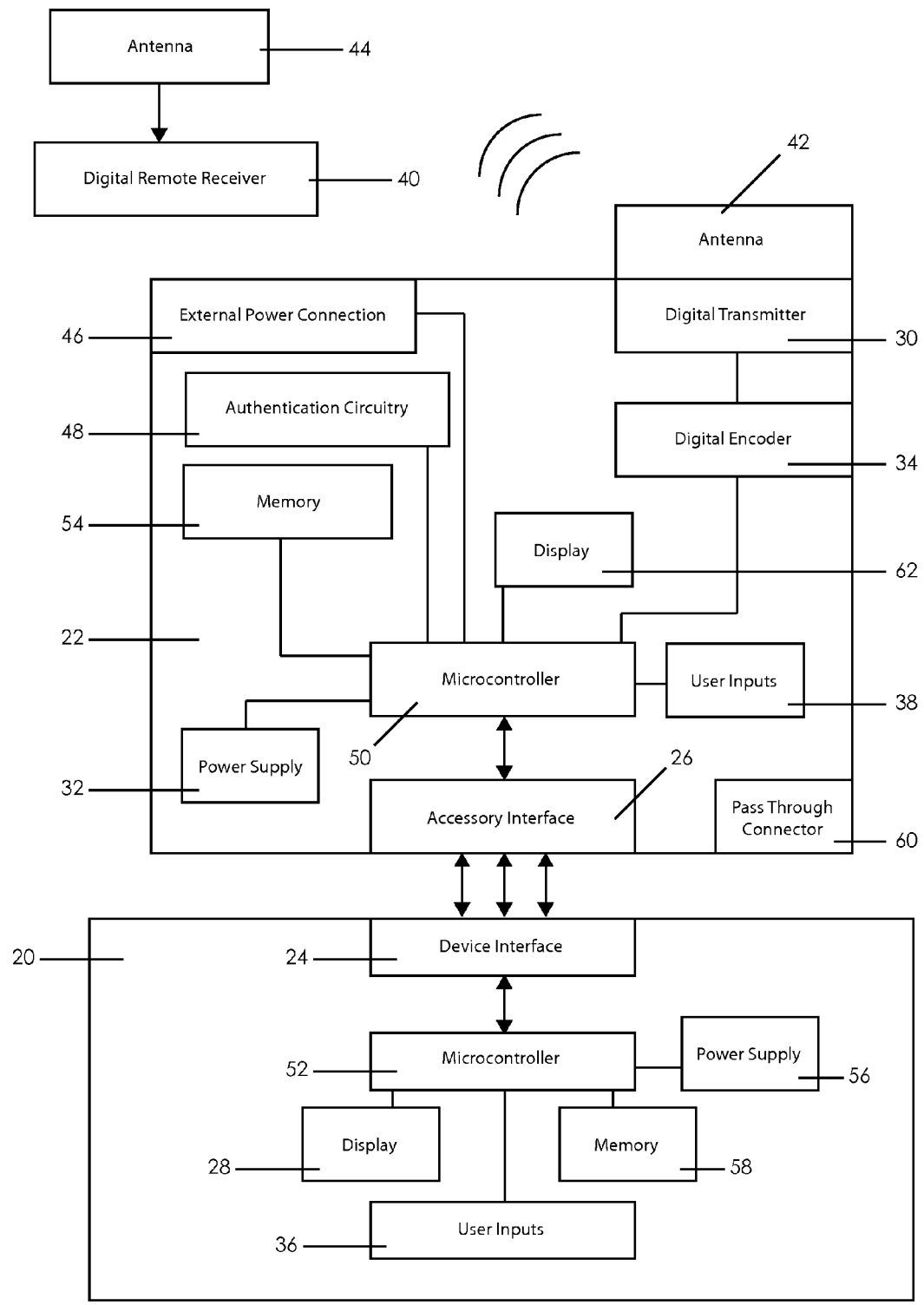
FIG. 2 is a functional block diagram of an accessory constructed in accordance with an embodiment of the present invention coupled to a portable electronic device.

Referring now to FIG. 2, a functional block diagram of an accessory constructed in accordance with an embodiment of the present invention coupled to a portable electronic device is shown. The device 20 is coupled to the accessory 22 through a pair of mating interfaces 24 and 26. In the embodiment shown, the interfaces between the device 20 and accessory 22 include a digital data channel, an analog audio signal line and a power connection. The accessory 22 exchanges digital data with the portable electronic device 20 through the digital data channel. The various functions of the accessory 22 are controlled by a microcontroller 50 that communicates with the microcontroller 52 of the device 20 through the interfaces 24 and 26 when the device 20 and accessory 22 are coupled together. By establishing digital communications between the controllers 50 and 52, the accessory 20 can exchange digital control information with the device 20. Thus, the accessory 22 can respond to manipulation of the user inputs 36 of the portable device 20 and display information on the display 28 of the device 20 as discussed in more detail herein. The accessory 22 can also read data from and write data to the memory 58 of the device 20. The digital data exchanged between the accessory 22 and device 20 may also include a digital media file and meta data concerning the digital media file.

The accessory 22 includes a digital transmitter 30 that transmits digital data to a digital remote receiver 40 through an accessory antenna 42 and a remote receiver antenna 44. The accessory 22 receives an analog audio signal from the device 20 through the interfaces 24 and 26. The accessory 22 then uses encoding circuitry 34 to create digital data corresponding to the analog audio signal received from the device 20. While the encoding circuitry 34 and the accessory microcontroller 50 are shown as separate elements in FIG. 2, those skilled in the art will recognize that the encoding circuitry 34 may be a separate circuit or included in the microcontroller 50. The digital transmitter 30 transmits the encoded audio signal to the remote receiver 40 for decoding and broadcast by the remote receiver 40. The microcontroller 50 can be used to alter the transmit frequency or channel of the digital transmitter 30 in response to a user manipulating a user input 36 or 38. An additional analog FM transmitter can be provided such that the accessory 22 can handle transmission to both digital an analog receivers if desired.

An accessory 22 constructed in accordance with a preferred embodiment of the present invention sends control data to the portable electronic device 20 that instructs the portable electronic device to display the currently selected transmitter frequency or channel on the display screen 28 of the device 20 as discussed in more detail herein. Alternatively, the accessory 22 may have a dedicated display 62. By utilizing the display 28 of the device 20, the cost of the components required to implement the accessory 22 is minimized. In addition, the accessory 22 can display menus on the screen on the device and allow a user to manipulate the menus through the use of the controls 36 of the portable electronic device 20 to control the functions of the accessory 22.

Since the digital data should be received by the remote receiver 40 with no or minimal errors, no additional interference is introduced during the transmission process from the device 20 to the remote receiver 40. In such an embodiment, any alteration in the original signal will be a result of the encoding process which can be managed to limit the amount of allowable distortion of the original signal. If the device 20 is capable of outputting digital audio data to the accessory 22, the digital data may be transmitted directly to the remote receiver 40 by the accessory 22 or have its format digitally altered by the digital encoder 34 if required for reception by the remote receiver.

The audio signal is preferably encoded as a digital radio signal in a format such as HD radio by the digital encoder 34 such that the output of the transmitter 40 can be received by a digital radio receiver. HD radio audio programming is broadcast in a digital audio format that utilizes coded orthogonal frequency-division multiplexing (OFDM). There are three types of data that can be broadcast and received with HD radio technology: (1) Audio Data (in HD format): (2) PSD (Program Stream Data) and (3) HD-DTP (Digital Transfer Protocol) Data. On the same frequency, HD radio broadcasters can broadcast several channels of audio programming. These different channels are referred to as the main HD channel, HD2, HD3, HD4, etc. While broadcasters have the option of up to around seven channels, by providing additional channels, they sacrifice bandwidth that has to be shared among all the channels they provide. Most digital radio stations operating in an HD radio format have a HD main channel, HD2, and HD3. The main HD channel is typically used by an HDC digital radio station to transmit a digital version of an analog broadcast and HD2 and HD3 are used for alternate radio programming or data services such as song information, weather reports and car navigation updates. HD format digital radio transmits the digital channels in unused portions of the same AM and FM channels used for the old analog stations.

The PSD HD channel allows for transmission of metadata including ID3 tags such as song, album, artist, genre, comment, commercial, etc. While these data fields are most often used to display program service data, the accessory can repurpose these fields such that new information such as text messages, advertisements, logos, song lyrics, etc. from the device 20 or accessory 22 can be transmitted to the remote receiver 40 and displayed on a display screen of the receiver 40. Custom messages can also be entered on the device 20 by the user and transmitted to the remote receiver 40 for display if desired. Longer messages can be scrolled across the display of the HD receiver.

HD-DTP (Digital Transfer Protocol) Data allows HD radio format broadcasters to offer conditional access services such as pay-per-listen radio. HD-DTP also enables premium content (e.g., podcasts, audio books, audio newspaper digests) to be transmitted to the digital receiver through streaming and file transfer (slower than real-time) to a flash memory buffer in the HD radio module. The flash memory enables HD receivers to incorporate time-shift features such as delay and capture, and store and replay. The store and replay functionality allows HD audio packets to be buffered and decoded at the simultaneously. The packets are routed to flash memory and to the HD decoder simultaneously, allowing listeners to record, and listen to, the same audio program. The accessory controls the features of the receiver such that digital content from the device can be buffered and stored in the receiver to prevent skipping and allow seamless fast forwarding and rewinding of the media being transmitted form the device to the receiver. This allows animated graphics to be transmitted from the device to the receiver through the accessory.

An appropriately equipped digital HD radio receiver can also receive data in these data fields which can be used to control functions of the digital receiver. Conversion codes and routines for converting device 20 outputs into receiver 40 inputs, or vice versa, can be stored in the accessory memory 54. Thus, an embodiment of the present invention can be configured such that a user can receive text messages with their mobile phone and transmit the messages to the digital receiver such that the user can view their messages on the screen of their car stereo receiver and manipulate the display of the receiver through the device's controls.

The audio signal can also be encoded as a satellite radio signal by the digital encoder 34 such that the output of the digital transmitter 30 can be received by a satellite radio equipped receiver. A satellite radio transmitter 30 typically operates in the "S" band (2.3 GHz) and provides Digital Audio Radio Service (DARS). In one embodiment, the accessory 22 includes logic and circuitry for analog, satellite and HD radio capabilities such that a user can select between the transmission formats using the user inputs 36 and 38 of the device 20 or accessory 22.

A transmitting accessory 22 constructed in accordance with an embodiment of the present invention may also include a verification system 48 that verifies that the accessory 22 is being used by an approved portable electronic device 20 or that the accessory 22 is an approved accessory for the device 20. The verification system 48 can use an identification resistor, a digital certificate, validation code or any other type of identification system or circuitry known in the art to verify that the device 20 and accessory 22 are produced by approved entities. Digital rights management software may also be included in the accessory 22 to verify the authenticity of any copyrighted material being transmitted from the device 20 to the remote receiver 40 by the accessory 22.

An accessory 22 constructed in accordance with an embodiment of the present invention also preferably includes a pass through connector 60 that allows a second accessory to couple to an output or input port of the electronic device 20 through the accessory 22. For example, the accessory may have a USB port that allows an external device to be coupled through the accessory to the USB port of the digital music player if the accessory covers the USB port of the device when it is coupled to the device. Alternatively, the pass through connector 60 can be used to supply power to the device 20 through the accessory 22.

The accessory 22 and device 20 can be powered in a number of different manners depending upon the parameters of the device 20 to which the accessory is adapted to be coupled. The accessory 22 may be a parasitic device that takes its power from the power supply 56 of the portable electronic device 20 if the device power supply 56 is capable of supplying the power required by the digital circuitry of the accessory 22. However, in alternate embodiments, the accessory may contain an internal power source 32 for powering the accessory 22 and charging the portable electronic device 20. An external power supply connection 46 also may be coupled to the portable electronic device 20 through the accessory 22 if desired. This allows the device 2 to be charged while it is coupled to the accessory 22 and the accessory 22 is functioning such that the accessory 22 can be used while the device 20 is being charged. In addition, the external power connection 46 provides the increased power required by the accessory's 22 digital circuitry without draining the power supply of the device 20.

Figure 3:
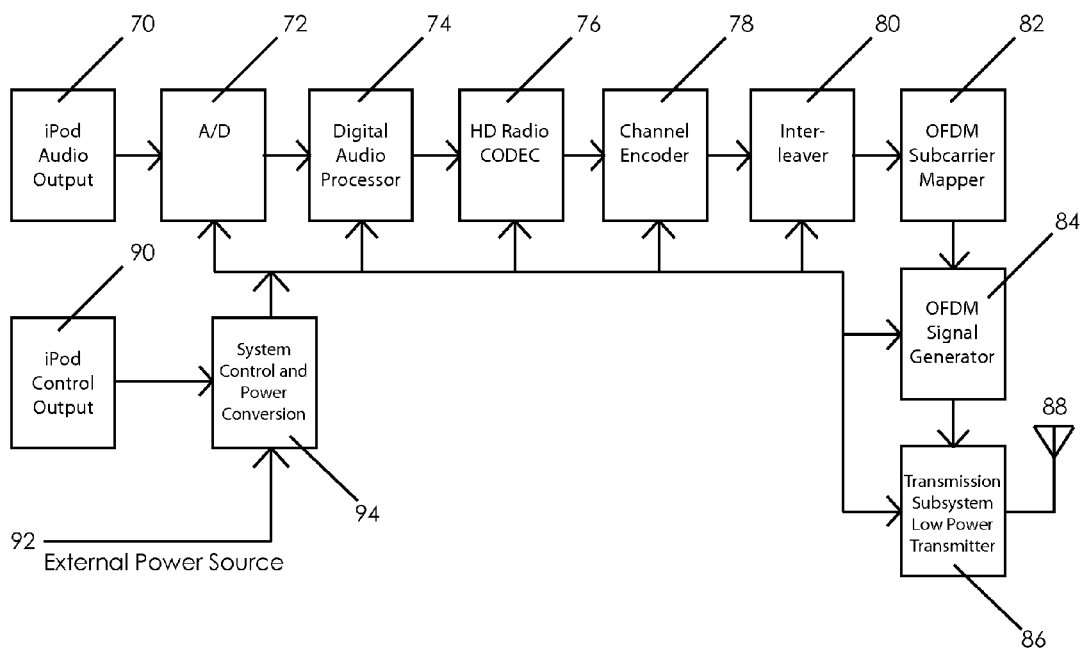
FIG. 3 is a block diagram setting forth a preferred set of encoding and transmission circuitry for receiving an analog audio signal, producing corresponding digital data and transmitting the digital data to a remote receiver in accordance with an embodiment of the present invention.

Referring now to FIG. 3, a block diagram setting forth a preferred set of encoding and transmission circuitry for receiving an analog audio signal, producing corresponding digital data and transmitting the digital data to a remote receiver in accordance with an embodiment of the present invention is shown. The audio output 70 of the electronic device is received by an analog to digital converter 72. The output of the digital converter 72 is fed to a digital audio processor 74. An HDC radio codec 76 then receives the processed output from the digital audio processor 74 and converts the data into an HD radio format. The HDC radio codec 76 can also receive data such main program service data from the system control circuitry 94 that specifies meta data such as artist and album information, etc. and encode the data into an HD format that can be decoded by an HD receiver. A channel encoder 78 encodes the HD encoded data for reception on a selected HD radio channel. The channel can preferably be selected by the user manipulating the controls of the device and the accessory sending the appropriate code to the remote receiver to configure the remote receiver to receive the selected channel. Alternatively, the accessory can simply be set to a particular channel and the remote receiver manually tuned to the selected channel. An interleaver 80 caches or stores the encoded data into short-term memory to provide uninterrupted transmission of the digital signal to avoid any drop off that might occur due to temporary interference. An orthogonal frequency division multiplexing (OFDM) subcarrier mapper 82 then adds the data to a subcarrier signal. An OFDM signal generator 84 receives the data and subcarrier and generates the transmission signal which is provided to a transmission subsystem 86 which transmits the data through an antenna 88. The antenna 88 may simply be a wire or ground coupled to the transmission subsystem 86

The encoding and transmission circuitry of the accessory also receives control data 90 from the portable electronic device and an external power supply 92 with system control and power conversion circuitry 94. The control data 90 can be used to alter the operating parameters of the accessory as discussed herein. The system control and power circuitry 90 provides the control signals and power needed by the various components of the encoding and transmission circuitry. While the individual components of the encoding and transmission circuitry are shown in FIG. 3 for exemplary purposes, those skilled in the art will recognize that most of the functions set forth can be implemented in a single ASIC, digital signal processor, field programmable gate array or microcontroller.

Figure 4:
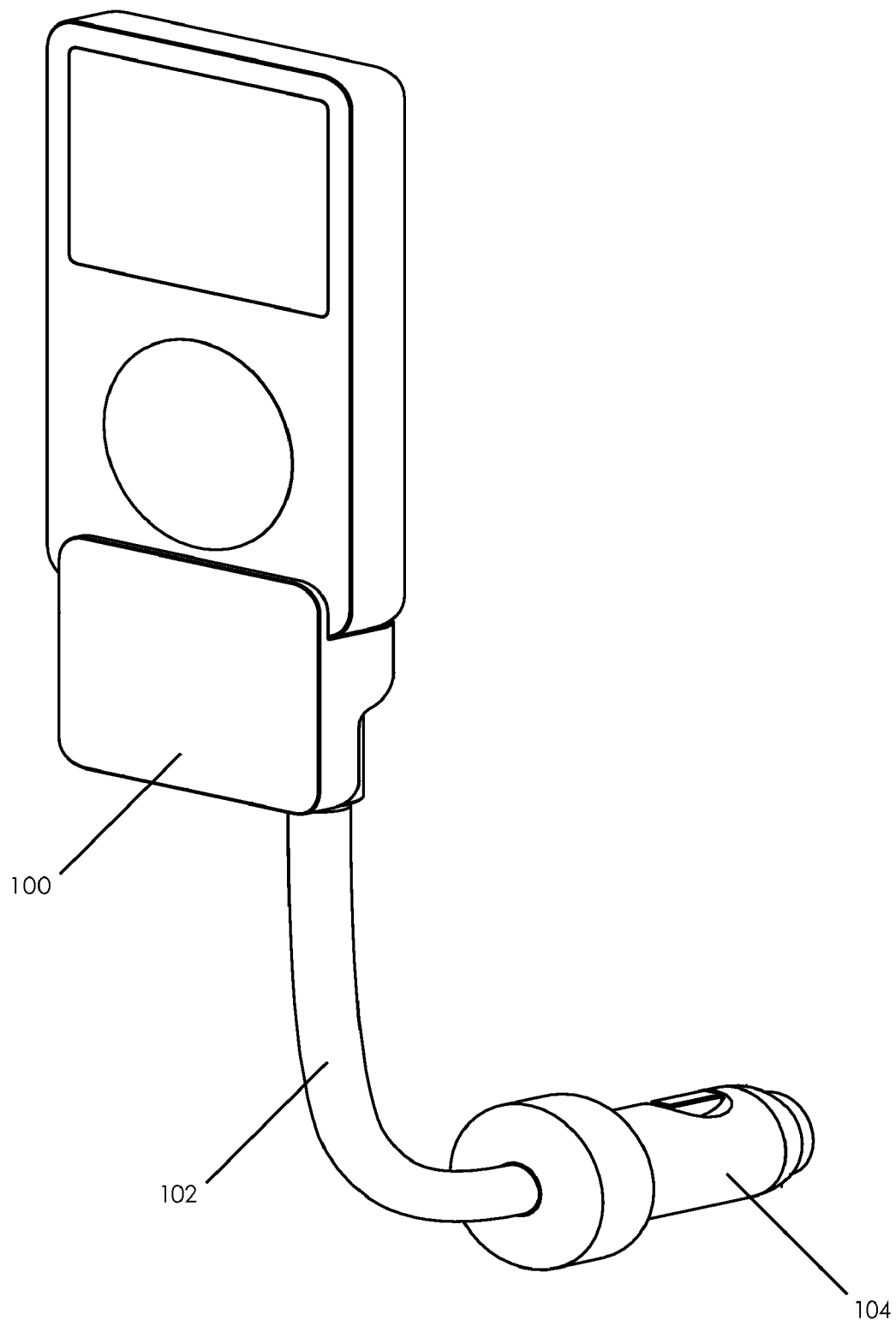
FIG. 4 is an illustration of an embodiment of the present invention adapted to be mounted in a 12-volt outlet.

Referring now to FIG. 4, an illustration of an alternative embodiment of the present invention adapted to be mounted in a 12-volt outlet is shown. The digital control transmitting accessory is constructed within a docking or supportive housing 100 having a connector adapted to receive the portable electronic device. The housing 100 is connected to a flexible extender 102 that has a 12-volt car accessory adapter 104 connected thereto. The adapter 104 mounts in the 12-volt receiver of a car such that the devices can be charged and held at a desirable location while transmitting to the automobile's digital stereo receiver. The user can then use the stereo controls to control the device or vice versa.

Although there have been described particular embodiments of the present invention of a new and useful DIGITAL CONTROLLER AND TRANSMITTER FOR PORTABLE ELECTRONIC DEVICE, it is not intended that such references be construed as limitations upon the scope of this invention except as set forth in the following claims.

What is claimed is:

1. An accessory for coupling with a portable electronic device, said accessory comprising:
    an input port for receiving audio data from said portable electronic device;
    a microcontroller and encoding circuitry for altering a format of said audio data;
    a digital transmitter for transmitting data in an orthogonal frequency-division multiplexed HD digital broadcast radio format corresponding to said audio data from the portable electronic device to a car stereo receiver in an FM or AM frequency transmission band; and
    a set of user controls that allows a user to select a broadcast transmission frequency for said digital transmitter;
    wherein a housing of the accessory is designed to be physically coupled to a housing of the portable electronic device such that the portable electronic device and the accessory can be carried as a single unit; and
    wherein user inputs of said portable electronic device can be used to control functions of said accessory.

2. The accessory of claim 1 wherein said audio data is an analog signal and said microcontroller and encoding circuitry digitally encodes said analog audio signal.

3. The accessory of claim 1 wherein the accessory is a parasitic device that obtains power from the portable electronic device.

4. The accessory of claim 1 wherein the accessory configures said remote receiver to receive data on a particular channel.

5. An accessory for use with a portable electronic device, said accessory comprising:
    an audio input for receiving an audio signal from said portable electronic device;
    a microcontroller and encoding circuitry for producing digital data corresponding to said audio signal;
    a digital transmitter for transmitting said digital data corresponding to said audio signal to a remote car stereo receiver using an orthogonal frequency-division multiplexed based HD digital broadcast radio format in an FM or AM frequency transmission band; and
    a set of user controls that allows a user to select a broadcast transmission frequency for said digital transmitter;
    wherein user inputs of said portable electronic device can be used to control functions of said accessory.

6. The accessory of claim 5 wherein said audio signal is a digital data signal and said microcontroller and encoding circuitry convert said digital data signal to an HD digital broadcast radio format.

7. The accessory of claim 5 wherein said audio signal is an analog signal and said microcontroller and encoding circuitry convert said analog signal to digital data.

* * * * *